United States Patent
Durairaj et al.

(10) Patent No.: US 6,828,383 B2
(45) Date of Patent: Dec. 7, 2004

(54) PHENOLIC MODIFIED RESORCINOLIC RESINS FOR RUBBER COMPOUNDING

(75) Inventors: Raj B. Durairaj, Monroeville, PA (US); C. Michael Walkup, New Kensington, PA (US); Mark A. Lawrence, New Kensington, PA (US)

(73) Assignee: Occidental Petroleum, Pittsburgh, PA (US)

( * ) Notice: Subject to any disclaimer, the term of this patent is extended or adjusted under 35 U.S.C. 154(b) by 0 days.

(21) Appl. No.: 10/369,366

(22) Filed: Feb. 18, 2003

(65) Prior Publication Data

US 2004/0116592 A1 Jun. 17, 2004

Related U.S. Application Data

(60) Provisional application No. 60/433,306, filed on Dec. 13, 2002.

(51) Int. Cl.[7] .............................................. C08L 61/06
(52) U.S. Cl. ....................... 525/134; 525/132; 525/136; 524/575.5
(58) Field of Search ................................. 525/134, 132, 525/136; 524/575.5

(56) References Cited

U.S. PATENT DOCUMENTS

| | | |
|---|---|---|
| 2,475,587 A | 7/1949 | Bender et al. |
| 3,332,911 A | 7/1967 | Huck et al. |
| 3,425,989 A | 2/1969 | Shepard et al. |
| 3,963,652 A | 6/1976 | Tanimura et al. |
| 4,010,144 A | 3/1977 | Dannels et al. |
| 4,421,891 A * | 12/1983 | Miyake et al. ............... 524/495 |
| 4,889,891 A * | 12/1989 | Durairaj et al. ............. 525/139 |
| 5,021,522 A * | 6/1991 | Durairaj et al. ............. 525/502 |
| 5,030,692 A * | 7/1991 | Durairaj ...................... 525/134 |
| 5,049,618 A * | 9/1991 | Wideman et al. ............ 525/136 |
| 5,049,641 A | 9/1991 | Hood et al. |
| 5,473,045 A | 12/1995 | Sizensky et al. |
| 5,494,785 A | 2/1996 | Sizensky et al. |
| 6,265,490 B1 | 7/2001 | Morel-Fourrier et al. |

OTHER PUBLICATIONS

International Search Report, PCT/US03/39823, Jun. 4, 2004.

* cited by examiner

*Primary Examiner*—David W. Wu
*Assistant Examiner*—Henry Hu
(74) *Attorney, Agent, or Firm*—Jenkens & Gilchrist, P.C.

(57) ABSTRACT

A vulcanizable rubber composition comprises (a) a rubber component; (b) a methylene donor compound; and (c) a methylene acceptor comprising a blend of a high ortho-ortho bonded phenolic novolak resin and a resorcinolic resin. The resin blend can be made by a number of methods. For example, it can be prepared by first reacting one or more phenolic compounds represented by the following formula:

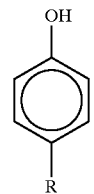

where R is selected from the group consisting of H, an alkyl group chain of 1–16 carbon atoms and an aralkyl group of 8–12 carbon atoms with an aldehyde in the presence of an ortho directing catalyst and then combining a resorcinol-formaldehyde novolak resin to obtain a phenolic and resorcinolic novolak resin blend.

41 Claims, 3 Drawing Sheets

PHENOLIC MODIFIED RESORCINOLIC RESINS FOR RUBBER COMPOUNDING

PRIOR RELATED APPLICATIONS

This patent application claims priority to U.S. Provisional Application Serial No.: 60/433,306, filed on Dec. 13, 2002, entitled "Phenolic Modified Resorcinolic Resins for Rubber Compounding," in the name of Raj B. Durairaj, C. Michael Wailcup, and Mark A. Lawrence, which is incorporated by reference herein in its entirety.

FEDERALLY SPONSORED RESEARCH STATEMENT

Not applicable.

REFERENCE TO MICROFICHE APPENDIX

Not applicable.

FIELD OF THE INVENTION

This invention relates to the synthesis and application of phenolic novolak modified resorcinolic resins.

BACKGROUND OF THE INVENTION

The performance of rubber composites in articles such as tires, belts and hose products depends on numerous factors including the quality of adhesion between the rubber and reinforcing materials, and the mechanical properties of the cured rubber matrix in contact with the reinforcing materials.

The conventional method of optimizing the adhesion of the rubber to the reinforcement comprises a two-part adhesive system that includes a methylene donor and a methylene acceptor. The methylene donor generates methylene or methylol groups capable of reading or crosslinking with the methylene acceptor, which interacts with the rubber and reinforcing material with a resultant increase in adhesion of the rubber to the reinforcing material. Because the methylene donor and the methylene acceptor are compounded into the rubber, they can have a significant effect on the properties of the final rubber product.

The most commonly used methylene donors are hexamethylenetetramine (HEXA) and hexamethoxymethyl melamine (HMMM). Dihydric phenols, polyhydric phenols and phenolic novolak resins have been used in the rubber industry as methylene acceptors. For example, resorcinol is a widely used dihydric phenol methylene acceptor for bonding rubber to the reinforcing materials. Because resorcinol is a small molecule, it can become uniformly distributed in the rubber during the compounding, resulting in excellent physical, mechanical and steel cord adhesion properties of the cured rubber products. But the fuming associated with resorcinol at Banbury temperature conditions causes problems, particularly with the loss of product.

Phenolic novolak resins have long also been used by the tire industry as the methylene acceptor in the rubber compound formulations. When these phenolic novolaks are cured with the methylene donors, such as the HMMM or HEXA (HMT), they increase the hardness, stiffness, tear resistance, abrasion resistance, tensile strength and modulus of the cured rubber compounds. In general, phenolic novolaks are used as tackifying and reinforcing resins in the rubber compound formulations. But they are not used in steel wire skim rubber compound formulations due to slow cure and high hysteresis. The relatively slow cure and the relatively high heat generation of the phenolic novolak resins are, therefore, expected to affect the adhesion of tire cords with the rubber. In order to improve the service life of tires, it is important that the bond between the tired cords, such as the steel, and the vulcanized rubber be relatively strong. Resorcinol use in rubber compounding formulations provides such a bond between the steel and rubber. This is due to the high reactivity of resorcinol towards the methylene donor and also produces a low hysteresis rubber compound.

Therefore, there is a need for an improved methylene acceptor for use in rubber compounding applications. Preferably, the methylene acceptor has a relatively shorter cure time so that improved rubber compositions can be obtained.

SUMMARY OF THE INVENTION

Embodiments of the invention fulfill the aforementioned need in one or more of the following aspects. In one aspect, the invention relates to a vulcanizable rubber composition which comprises (I) a rubber component selected from natural rubber, synthetic rubber or combinations thereof; (II) a methylene donor compound which generates formaldehyde upon heating,; and (III) a methylene acceptor compound comprising a phenolic and resorcinolic novolak resin blend represented by the following structures:

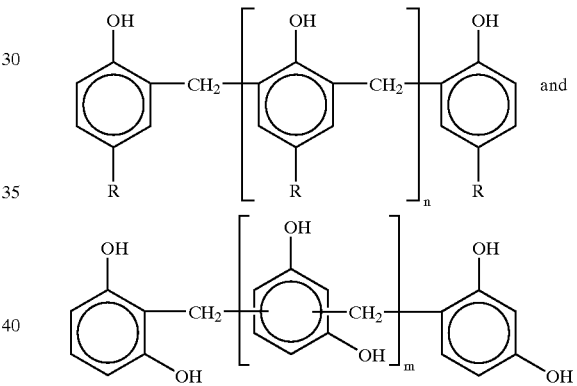

where n is equal to or greater than 1, and m is equal to or greater than 1. The phenolic and resorcinolic novolak resin blend generally has a weight ratio of phenolic resin to resorcinolic resin between about 95:5 to 5:95. In some embodiments, the phenolic and resorcinolic novolak resin blend is prepared by prepared by (a) reacting one or more phenolic compounds represented by the following formula:

where R is selected from the group consisting of H, an alkyl group chain of 1–16 carbon atoms and an aralkyl group of 8–12 carbon atoms with an aldehyde in the presence of an ortho directing catalyst and (b) combining with a resorcinol-formaldehyde novolak resin. Certain phenolic and resorcinolic novolak resin blends comprise (a) o–o' phenolic methylene linkages in the range of about 25 to 96%; (b) o–p' phenolic methylene linkages in the range of about 4 to 50%; (c) combined o–o' phenolic methylene linkages and 4–4' resorcinolic methylene linkages in the range of about 10–90%; and (d) p–p' phenolic methylene linkages in the range of about 1 to 30%.

In other embodiments, the methylene acceptor is prepared by reacting (A) phenol and/or an alkyl phenol with (B) an aldehyde in the presence of (C) an ortho directing divalent metal salt catalyst to produce a high ortho phenolic novolak products containing at least 25% ortho-ortho phenolic methylene bridges and then (D) adding resorcinol or resorcinolic derivative or a meta-substituted phenol and then (E) reacting with an additional amount of an aldehyde. The resin blend made by such a process comprises the following structures:

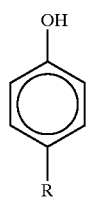

where R is selected from the group consisting of H an alkyl chain of $C_1$–$C_6$ carbon atoms and an aralkyl group of $C_8$–$C_{12}$ carbon atoms with (B) an aldehyde in the presence of (C) an azeotroping solvent and (D) an ortho directing

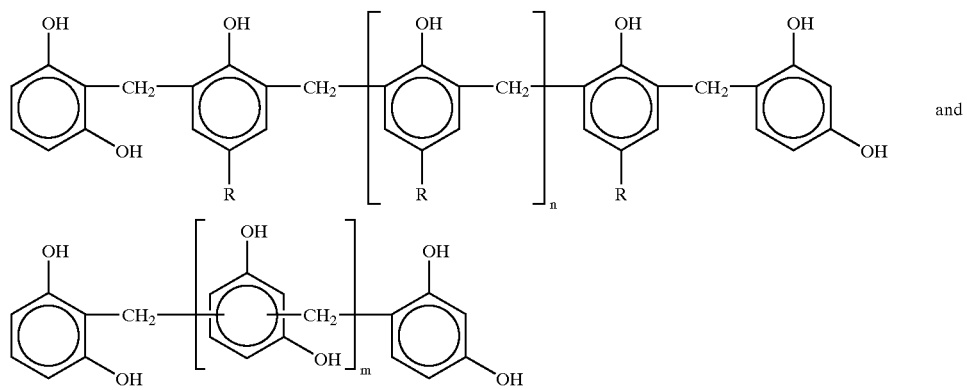

where n is equal to or greater than 1, and m is equal to or greater than 1. In some processes, the molar ratio of phenol and/or alkylphenol to formaldehyde is about 1/0.4 to 1/0.86; the molar ratio of resorcinol or resorcinol derivative or m-substituted phenol to formaldehyde is about 1/0.4 to 1/0.7. In other processes, the alkyl phenol is used to prepare the phenolic novolak resin, and the resin comprises o–o' methylene linkage in the range of about 40 to 70%. In some processes, the alkyl phenol used to prepare the phenolic novolak is selected from para substituted alkyl chain containing 1 to 16 carbon atoms or aralkyl substituted phenols selected from the group consisting of p-cresol, p-tert-butylphenol, p-tert-octyl phenol, p-tert-butyl-phenol, p-tert-octyl phenol, p-tert-nonylphenol, p-nonylphenol, p-styrylphenol and pethylphenol. In other processes, the molar ratio of phenol and/or alkylphenol to aldehyde is between about 0.1:0.9 and about 0.9:0.1. In some processes, the aldehyde is formaldehyde, acetaldehyde, propionaldehyde, butyraldehyde, isobutyraldehyde, valeraldehyde, crotonoaldehyde, benzaldehyde, furfural, or a mixture thereof. In other processes, the resorcinolic derivative or meta-substituted phenol is selected from the group consisting of 2,4-dihydroxy benzophenone, 2,4-dihydroxy acetophenone, 4-styryl resorcinol, m-cresol, cashew nut shell liquid, phloroglucinol, 3-methyl-5-ethyl phenol, meta-isopropyl phenol, m-isoctyl phenol and 3,5-dimethyl phenol.

In some other embodiments, the methylene acceptor is prepared by reacting (A) one or more phenolic compounds represented by the following formula:

catalyst comprising a divalent electropositive metal compound selected from the group consisting of oxides, hydroxides, formates, lactates, acetates, benzoates, and mixtures of calcium, barium, strontium, magnesium, zinc, manganese, cobalt and lead; (E) then adding resorcinol or resorcinolic derivative or a preformed resorcinol-formaldehyde novolak resin. In some processes, the azeotrope solvent is selected from the group consisting of toluene and xylene. The resin blend made by the process (which can used as a methylene acceptor) comprises the following structures:

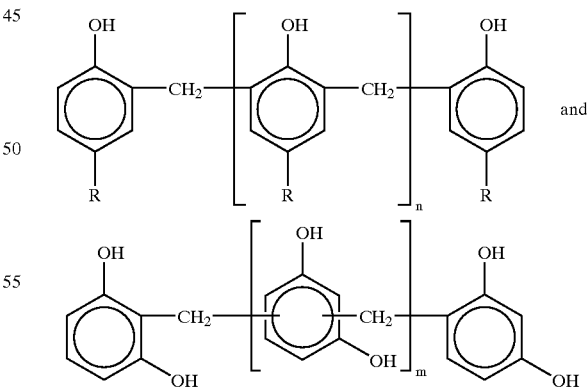

where n is equal to or greater than 1, and m is equal to or greater than 1. Certain resin blends made by the process comprise (1) o–o' phenolic methylene linkages in the range of about 25 to 98%; (2) o–p' phenolic methylene linkages in the range of about 4 to 50%; (3) p–p' phenolic methylene linkages in the range of about 1 to 30%; and (4) combined o–o' phenolic methylene linkages and 4–4' resorcinolic methylene linkages in the range of about 10 to 90%. Certain other resin blends comprise about 90 to about 98% o–o' methylene bridges. In some cases, the resin blend has a weight ratio of phenolic resin to resorcinolic component between about 95:5 to about 5:95.

In other embodiments, the vulcanizable rubber composition further comprises a reinforcing material selected from the group consisting of nylon, rayon, polyester, polyamide, fiberglass, and steel. In some cases, the rubber composition is used in preparation of composite products for the manufacture of tires, power belts, conveyor belts, printing rolls, automobile floor mats, mud flaps for trucks or ball mill liners.

In another aspect, the invention relates to a vulcanizable rubber composition which comprises: (I) a rubber component selected from natural rubber, synthetic rubber or combinations thereof; (II) a methylene donor compound which generates formaldehyde upon heating; and (III) a methylene acceptor compound prepared by first reacting one or more phenolic compounds represented by the following formula:

where R is selected from the group consisting of H, an alkyl group chain of 1–16 carbon atoms and an aralkyl group of 8–12 carbon atoms with an aldehyde in the presence of an ortho directing catalyst and then combining a resorcinol-formaldehyde novolak resin to obtain a phenolic and resorcinolic novolak resin blend.

Additional aspects of the invention and characteristics and properties of various embodiments of the invention become apparent with the following description.

DESCRIPTION OF EMBODIMENTS OF THE INVENTION

Figure 1:
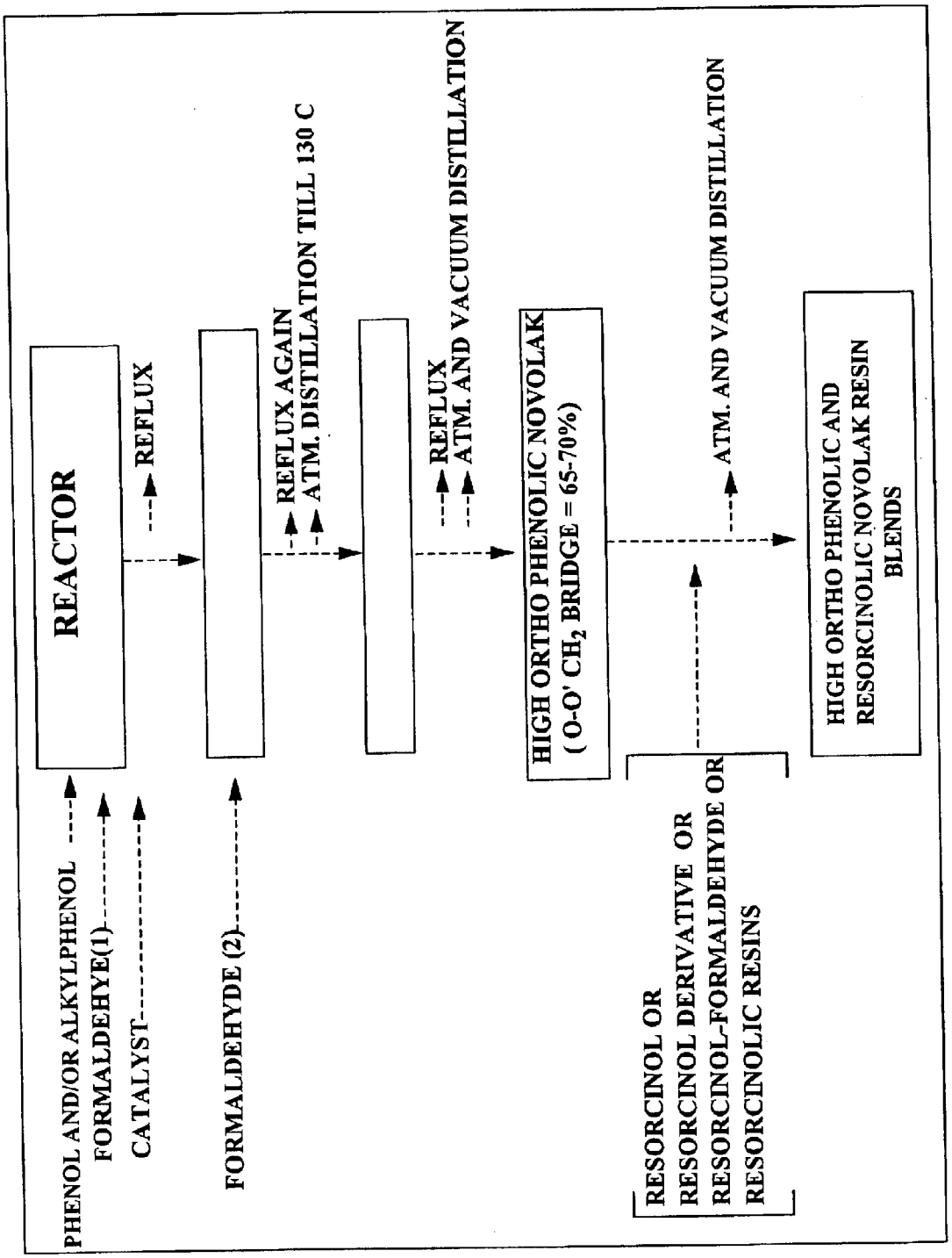
FIG. 1. shows a reaction scheme for the synthesis of a high ortho phenolic resin modified resorcinolic novolak resin.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide a high ortho-ortho bonded phenolic novolak resin and its blend with a resorcinolic resin for use as a methylene acceptor in a vulcanizable rubber composition. For the sake of brevity, the term "ortho-ortho bonded" is abbreviated as "ortho" in the following description. In addition, embodiments of the invention also provide vulcanizable rubber compositions based on the resin blends.

A high ortho phenolic novolak resin refers to a phenolic novolak resin with at least 25% ortho-ortho bonding. In some embodiments, the ortho-ortho bonding level is at least 35%, at least 40%, at least 45%, at least 50%, at least 60%, at least 70%, or at least 80%. Preferably, the ortho-ortho bonding level is at least 85%, at least 90% or at least 95%. When the ortho-ortho bonding level exceeds 90% in a phenolic novolak resin, such a resin is referred to herein as "very high ortho" phenolic novolak. The percent content of ortho-ortho bonding in the novolaks can be determined by $^{13}$C-NMR spectra run in deuterated methanol. Tetramethylsilane can be used as the internal reference. The percent ortho-ortho bonding equals 100 times the integration (or area) of the signal of ortho-ortho methylene bridges seen in the range from 23.5 to 32 ppm divided by the total integration (or area) of all methylene bridge signals seen in the range from 23.5 to 38 ppm.

The high ortho phenolic novolak modified resorcinolic resins in accordance with embodiments of the invention may be prepared by blending (1) a high ortho phenolic novolak resin, and (2) a resorcinol-formaldehyde novolak resin. The high ortho phenolic novolak resin for this blend can be prepared by reacting phenol or p-alkyl or aralkyl phenol and formaldehyde in the presence an ortho directing catalyst. Suitable phenols include, but are not limited to, a trifunctional phenol, such as phenol or m-alkyl substituted phenol, and a difunctional phenol, such as p-cresol, p-tert octyl phenol, p-tert-nonylphenol, p-nonyl phenol, p-tert-butyl phenol etc. A catalyst suitable for use in the synthesis of the high ortho novolak resin is a divalent metal ion, such as calcium, magnesium, zinc, strontium, cadmium, lead and/or barium. The catalysts are usually bivalent metal salts of weak organic acids, namely, acetate salts, citrate salts, glycolate salts or tartarate salts. The high ortho phenolic novolak modified resorcinolic resins may include one or both of the compounds represented by the following formulas:

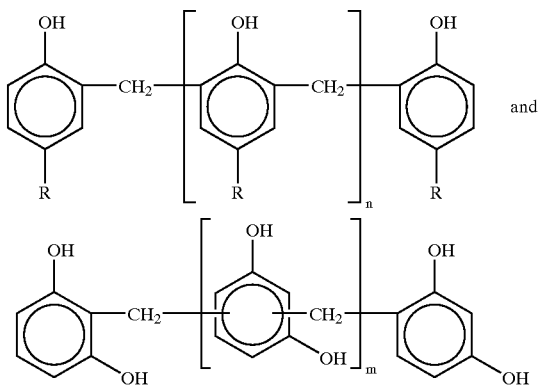

wherein R can be H, an alkyl group of $C_1$–$C_{16}$, or an aralkyl group of $C_8$–$C_{12}$; and n or m is equal to or greater than one.

Generally, n ranges from about 1 to about 1000. In some instances, n is less than about 500, less than about 300, or less than about 200. Generally, m ranges from about 1 to about 500. In some instances, m is less than about 200, less than about 150, or less than about 100. While these ranges are preferred for some applications of the resins, m and n outside the ranges may be preferred for other applications. In the above formula for the resorcinol resin, it is shown that the all of the linkages are 2–6'. However, this need not be the case for the resorcinol resin. Other linkages, such as 2–4' linkage, are also possible. Suitable resorcinol resins can comprise the same or different linkages.

In some embodiments of the invention, a high ortho phenolic novolak modified resorcinolic resin is prepared by carrying out the resorcinol-formaldehyde reaction after the formation of a high ortho phenolic novolak resin from the phenol and/or alkyl phenol-formaldehyde reaction in the presence of an ortho directing catalyst. The resulting resinous product obtained may include compounds with the following formulas.

resorcinol resins may be blended with the high ortho phenolic resins with or without modifications. It should be recognized that the term "resorcinol resin" used herein encompasses not only the resin made from the condensation reaction of resorcinol and formaldehyde but also those made from a derivative of resorcinol or substituted resorcinol and one or more aldehydes.

Another embodiment of this invention provides a rubber composition comprising: a) a rubber component; b) a methylene donor; and c) a methylene acceptor. The methylene acceptor can be any of the high ortho phenolic novalak modified resorcinolic resins described above. For example; the methylene acceptor can be prepared by reacting phenol and/or an alkylphenol with formaldehyde in the presence of an ortho directing catalyst first, and then blending the reaction product with a preformed resorcinol-formaldehyde novolak resin or carrying out the resorcinol-formaldehyde reaction to produce a blend as described above. Reinforced rubber articles may further comprise a reinforcing material.

Embodiments of the invention also provide a process to make a high ortho and also a very high ortho phenolic

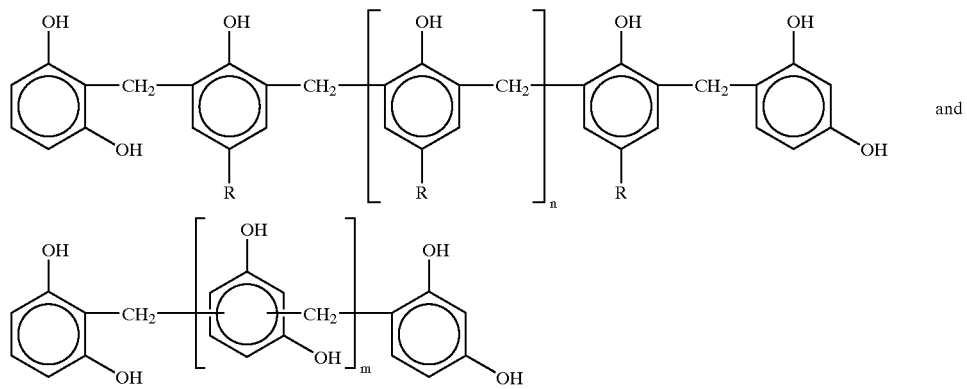

In the above formulas, n ranges from about 1 to about 1000. In some instances, n is less than about 500, less than about 300, or less than about 200. Generally, m ranges from about 1 to about 500. In some instances, m is less than about 200, less than about 150, or less than about 100. While these ranges are preferred for some applications of the resins, m and n outside the ranges may be preferred for other applications. In the above formula for the resorcinol resin, it is shown that the all of the linkages are 2–6'. However, this need not be the case for the resorcinol resin. Other linkages, such as 2–4' linkage, are also possible. Suitable resorcinol resins can comprise the same or different linkages.

In addition, various high ortho phenolic resins are disclosed in the following U.S. Pat. Nos. 2,475,587; 3,332,911; 3,425,989; 4,010,144; 5,473,045; and 5,494,785, which are incorporated by reference in their entirety herein. All such phenolic resins may be used in various embodiments of the invention with or without modifications. It should be recognized that the term "phenol resin" used herein encompasses not only the resin made from the condensation reaction of phenol and formaldehyde but also those made from a derivative of phenol or substituted phenol and one or more aldehydes.

Additional suitable resorcinol resins are disclosed in the following U.S. Pat. Nos. 6,472,457; 5,945,500; 5,936,056; 5,300,618; 5,244,725; 5,075,414; 5,075,413; 5,059,723; 5,049,641; 5,030,692; 5,021,522; 4,892,908; 4,889,891; 4,476,191; 4,025,454; 3,956,205; and 2,385,372, which are incorporated by reference in their entirety herein. These novolak modified resorcinolic novolak resin products for use in rubber compounding applications.

Some embodiments provide a novel rubber compounding phenolic novolak modified resorcinolic resin comprising a methylene chained polyphenol wherein at least 50% of the total number of methylene linkages are coupled to adjacent phenol groups at the ortho-ortho position. It is preferred that the ortho-ortho (o–o') phenolic methylene bridge constitutes from about 25% to about 96%, and more preferably from about 30% to about 80%. The total number of o–o' phenolic methylene bridges and 4–4' resorcinolic methylene bridges present in the resin may vary from about 10% to about 90%, preferably from about 40% to about 80%. Preferably, from about 1% to about 30% of the total number of phenolic methylene linkages are coupled at the para-para (p–p') position. At least 25% of the phenolic methylene linkages in the resulting resin is o–o', and at least a minor portion of the total number of phenolic methylene linkages is p–p'.

Embodiments of the invention also provide a vulcanizable rubber composition having improved adhesion between the rubber and a reinforcing material, while at the same time having improved mechanical properties for the cured rubber matrix in contact with the reinforcing material.

As mentioned above, improved vulcanizable rubber compositions can be prepared by using the high ortho phenolic novolaks modified with resorcinolic novolak resins as the methylene acceptors. The improved vulcanizable rubber composition comprise: (I) a rubber component selected from natural and synthetic rubbers; (II) a methylene donor compound which generates formaldehyde by heating; and (III) a high ortho phenolic novolak modified resorcinolic novolak type methylene acceptor. Optionally, the rubber composition may further comprise (IV) a vulcanizing agent, such as sulfur; and (V) one or more rubber additives.

The rubber component can be any natural rubber, synthetic rubber or combination thereof Specific examples of synthetic rubbers include neoprene (polychloroprene), polybutadiene, polyisoprene, butyl rubber, copolymers of 1,3-butadiene or isoprene with monomers such as styrene, acrylonitrile and methyl methacrylate as well as ethylene/propylene/diene monomer (EPDM) and in particular ethylene/propylene/dicyclopentadiene terpolymers.

The methylene donor component can be any compound that generates formaldehyde upon heating during the vulcanization and capable of reacting with the methylene acceptor used in the rubber compound formulations. Examples of suitable methylene donors include, but are not limited to, hexamethylenetetramine (HEXA or HMT) and hexamethoxymethylmelarine (HMMM). Additional suitable methylene donors are described in U.S. Pat. No. 3,751,331, which is incorporated by reference herein in its entirety. The methylene donor is usually present in concentrations from about 0.5 to 15 parts per one hundred parts of rubber, preferably from 0.5 to 10 parts per one hundred parts of rubber. The weight ratio of methylene donor to methylene acceptor may vary. But, in general, the weight-ratio will range from 1:10 to 10:1. Preferably, the weight ratio of methylene donor to methylene acceptor ranges from 1:3 to 3:1.

The vulcanizable rubber composition may include a vulcanizing agent, such as sulfur. Examples of suitable sulfur vulcanizing agents include elemental sulfur or sulfur donating vulcanizing agents. Preferably, the sulfur vulcanizing agent is elemental sulfur.

The vulcanizable rubber composition may also include one or more additives used in rubber compositions. The additives commonly used in the rubber stocks include carbon black, cobalt salts, stearic acid, silica, zinc oxide, fillers, plasticizers, waxes, processing oils, retarders, antiozonants and the like.

Accelerators are also used to control the time and/or temperature required for the vulcanization and to improve the properties of the vulcanizate. Suitable accelerators include, but are not limited to, amines, disulfides, guanidines, thioureas, thiazoles, thiurams, sulfenamides, dithicarbonates and zanthates. Preferably, the primary accelerator is a sulfenamide.

The rubber compound described herein may be used as a wire coat or bead coat for use in the tire applications. Any form of the cobalt compounds known in the art to promote the adhesion of rubber to metal, such as stainless steel, may be used. Suitable cobalt compounds which may be employed include cobalt salts of fatty acids such as stearic acid, palmitic acid, oleic acid, linoleic acid, and the like; cobalt salts of aliphatic or alicyclic carbocylic acids having 6 to 30 carbon atoms; cobalt chloride, cobalt naphthenate, cobalt neodeconoate, and an organo-cobalt-boron complex commercially available under the trade name Monobond C.

Figure 2:
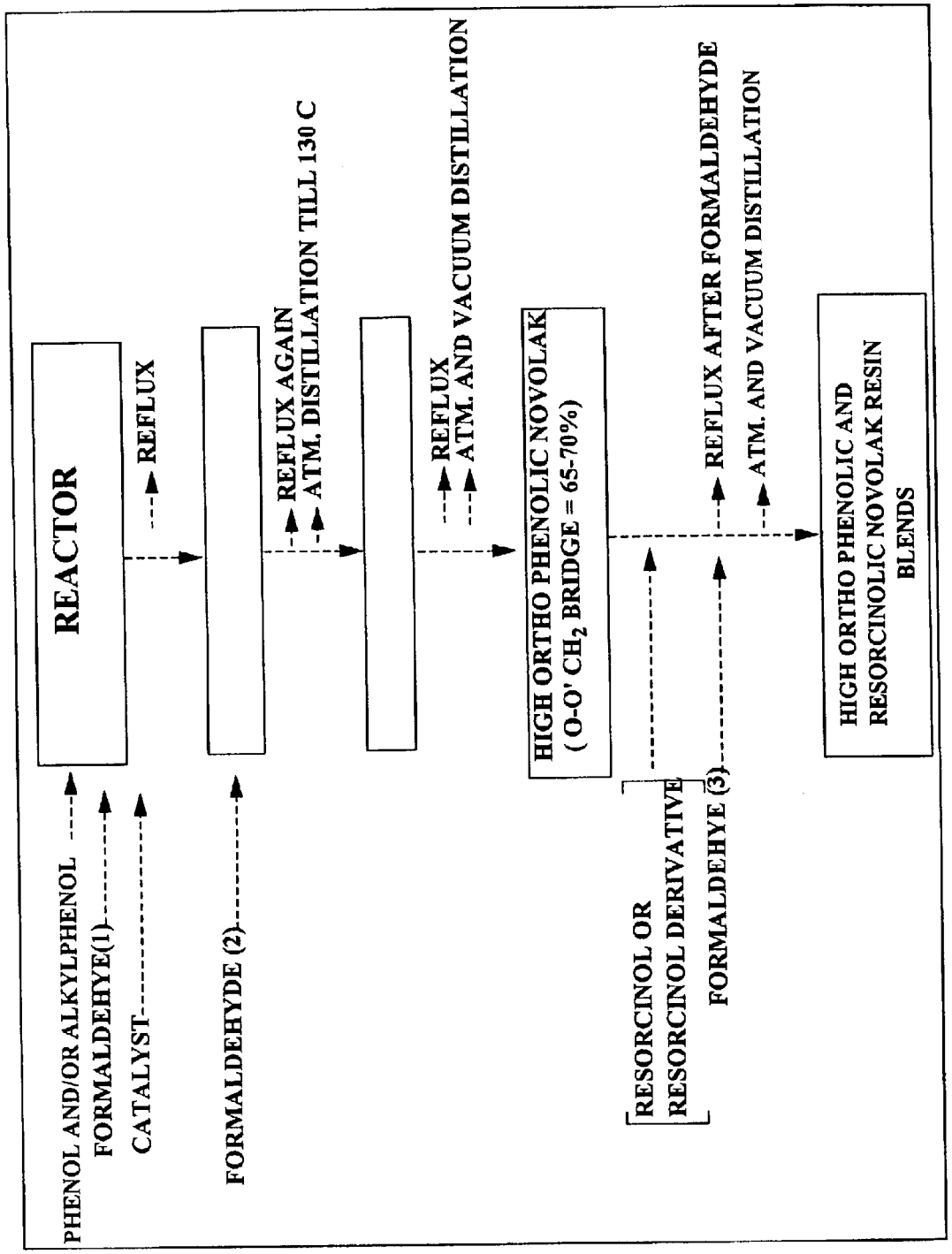
FIG. 2. shows a reaction scheme for the synthesis of a high ortho phenolic novolak modified with resorcinol-formaldehyde reaction product.
Figure 3:
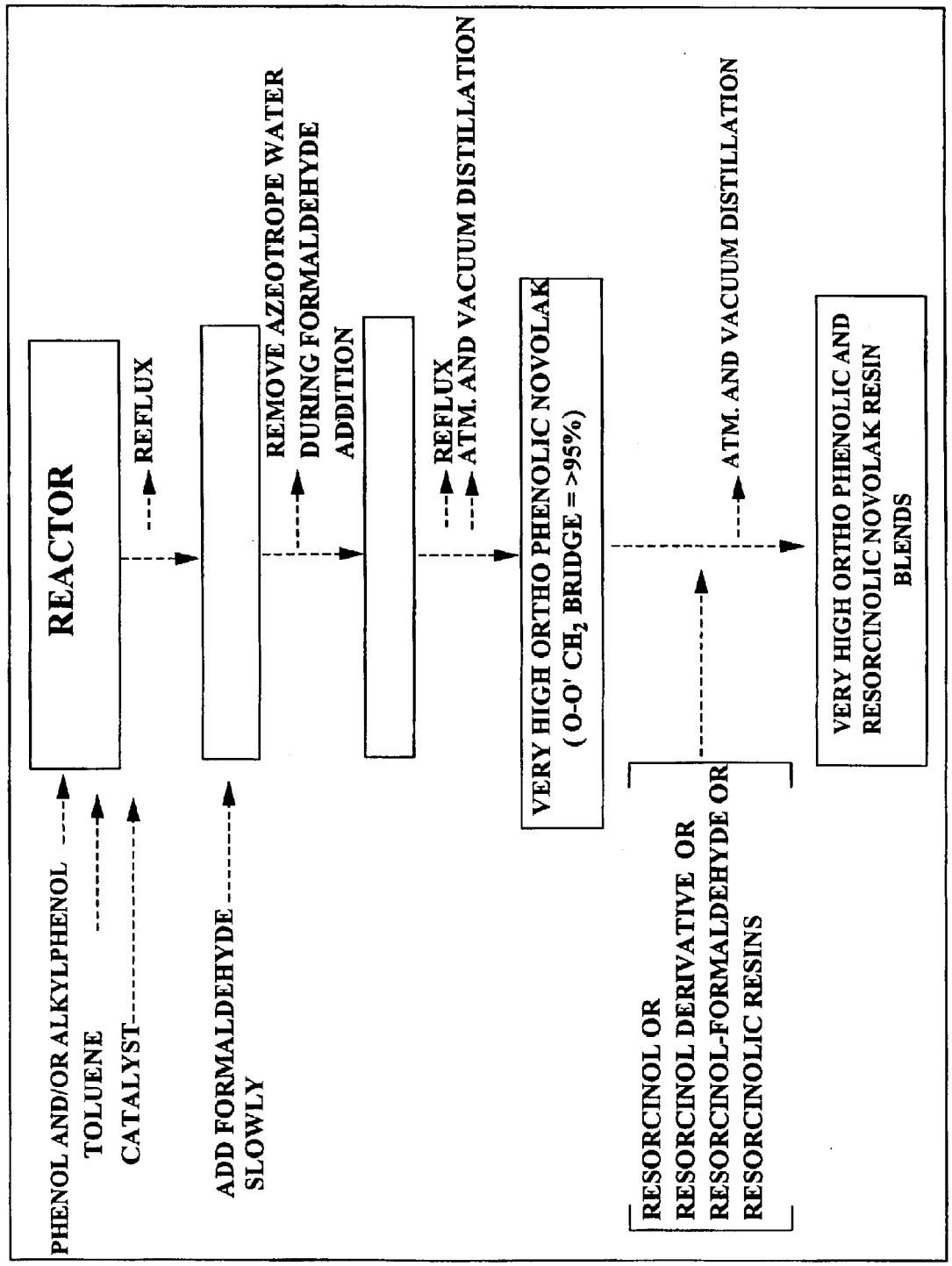
FIG. 3. shows a reaction scheme for the synthesis of a very high ortho phenolic resin modified resorcinolic novolak resins.

The methylene acceptor used in embodiments of the invention is a high ortho phenolic novolak modified resorcinolic resin that can be prepared following one of the three reaction schemes illustrated in FIGS. 1–3.

Referring to FIG. 1, one way to make the methylene acceptor resin is to synthesize a high ortho substituted phenolic novolak type resin first by reacting one or more phenolic compounds as represented by the following general formula (a)

wherein R is selected from H, an alkyl chain of 1–16 carbon atoms and an aralkyl group of $C_8$–$C_{12}$ carbon atoms with an aldehyde, such as formaldehyde, para-formaldehyde, or acetaldehyde in the presence of an ortho directing catalyst, such as an oxide, hydroxide or organic acid salt of a divalent metal ion such as calcium, magnesium, zinc, strontium, cadmium, lead and barium. Then, a pre-formed resorcinol-formaldehyde novolak was added into the phenolic novolak, mixed thoroughly and dehydrated to obtain a high ortho phenolic and resorcinolic novolak resin blend.

In some embodiments, phenol and/or an alkyl phenol, such as t-octyl phenol, are allowed to react with aqueous formaldehyde in two different stages. The pH of this reaction mass is in the range of about 4 to about 7, depending upon the type of ortho directing catalyst used for the reaction. The phenol-formaldehyde reaction mixture is refluxed in such a way that almost all the formaldehyde present completely reacts with phenol. The formaldehyde attaches predominantly at the ortho position of the phenolic ring to provide the following type of structure:

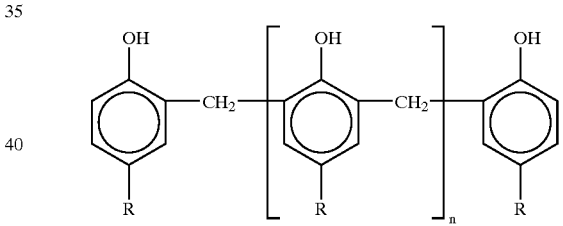

wherein n is equal to or greater than 1, depending on the molar ratio of the phenol and formaldehyde. These phenolic novolaks have a high ortho orientation and are called "high ortho phenolic novolak resins". This results in a substantially linear polymer which exhibits relatively high cure rates with methylene donors, such as HEXA or HMMM.

After the formation of phenolic novolak, the temperature is now slightly reduced and then a resorcinol-formaldehyde novolak resin solution is added and the final resin blend is dehydrated to obtain a phenolic and resorcinolic novolak resin blend. The resin product may be characterized by the following formulas.

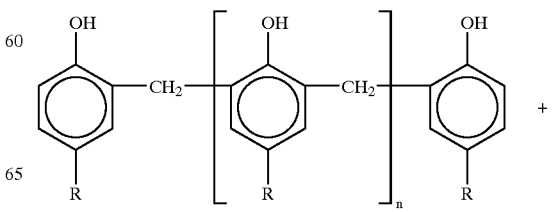

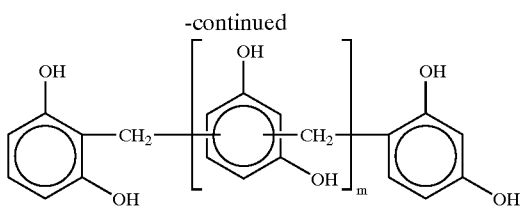

wherein R can be H, an alkyl group of $C_1$–$C_{16}$ or an aralkyl group of $C_8$–$C_{12}$ carbon atoms. In the above formulas, n ranges from about 1 to about 1000. In some instances, n is less than about 500, less than about 300, or less than about 200. Generally, m ranges from about 1 to about 500. In some instances, m is less than about 200, less than about 150, or less than about 100. In the above formula for the resorcinol resin, it is shown that the all of the linkages are 2–6'. However, this need not be the case for the resorcinol resin. Other linkages, such as 2–4' linkage, are also possible. Suitable resorcinol resins can comprise the same or different linkages.

In some embodiments, the sum of the o–o' and o–p' phenolic methylene linkages should preferably be at least about 90% and the p–p' phenolic methylene linkages be less than 5% for the high ortho phenolic novolak resin. For the phenolic and resorcinolic resin blends, the sum of o–o' phenolic, 4–4' resorcinolic, and o–p' phenolic methylene bridges should be about 80% or greater.

Instead of adding a resorcinol-formaldehyde novolak resin, a highly reactive methylene acceptor, such as resorcinol, resorcinolic derivative, meta-substituted phenol, or resorcinol based novolak type resin can be used to prepare a highly reactive methylene acceptor from the high ortho phenolic novolak resin. Examples of suitable resorcinolic derivatives or meta-substituted phenols include, but are not limited to, 2,4-dihydroxy benzophenone, 2,4-dihydroxy acetophenone, 4-styryl resorcinol, m-cresol, cashew nut shell liquid, phloroglucinol, 3-methyl-5-ethyl phenol, meta-isopropyl phenol, m-isoctyl phenol and 3,5-dimethyl phenol.

In the preparation of a blend containing the high ortho phenolic resin and resorcinol or resorcinol derivative and/or resorcinolic resins, the weight ratio of phenolic resin to resorcinolic resins vary between 95:5 to 5:95. This ratio depends on the performance level required for a specific application.

In the preparation of high ortho phenolic novolak, the molar ratio of phenol and/or alkyl phenol to formaldehyde is usually between about 1:1, and preferably about 1/0.4 to 1/0.9 and most preferably in the range of about 1/0.6 to 1/0.85. The resorcinolic novolak used to make the resin blends can be prepared using resorcinol to formaldehyde molar ratios in the range of about 1/0.4 to 1/0.8, preferably in the range of about 1/0.6 to 1/0.7.

The phenolic novolak resins and the resorcinolic resin separately prepared may be admixed together by any methods. But the final resin mixture blend should be thoroughly dried under atmospheric and vacuum dehydration conditions to obtain a uniform product for commercial applications.

Referring to FIG. 2, the resin blend can also be produced in a two step condensation reaction. The methylene acceptor resin produced by the two step condensation can also be referred to as the blend resin. The first condensation is carried out by reacting one or more phenolic compositions selected from compounds represented by the general formula (a)

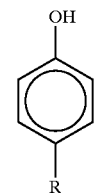

wherein R is selected from H an alkyl chain of $C_1$–$C_{16}$ carbon atoms and an aralkyl group of $C_8$–$C_{12}$ carbon atoms or an aralkyl group of $C_8$–$C_{12}$ carbon atoms with an aldehyde, such as formaldehyde, para-formaldehyde and acetaldehyde in the presence of an ortho directing catalyst. Following the first phenol-formaldehyde condensation, resorcinol is charged into the reactor and allowed to react with the formaldehyde to obtain a high ortho phenolic resin modified resorcinolic novolak resins.

The methylene acceptor resin obtained from the reaction scheme outlined FIG. 2 may have the general following formulas.

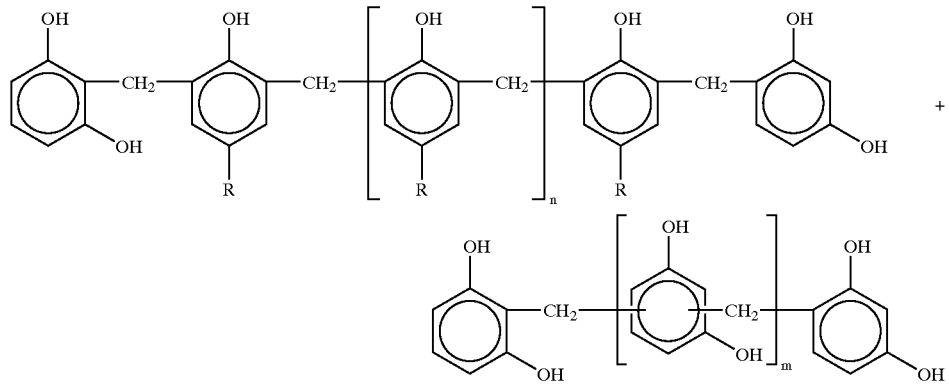

In the above formulas, n ranges from about 1 to about 1000. In some instances, n is less than about 500, less than about 300, or less than about 200. Generally, m ranges from about 1 to about 500. In some instances, m is less than about 200, less than about 150, or less than about 100.

In the second condensation step, various other aldehydes can also be used to obtain the novolak resin blends. Suitable aldehydes that can be employed in the place of formaldehyde or in addition to formaldehyde are acetaldehyde, propionaldehyde, butyraldehyde, isobutyraldehyde, valeraldehyde, crotonaldehyde, benzaldehyde, furfural and the like. Also, highly reactive resorcinolic derivatives can be substituted for resorcinol to prepare high ortho phenolic resin modified resorcinolic resins.

Referring to FIG. 3, the resin blends can also be produced from the following process. Instead of obtaining a high ortho phenolic novolak (i.e., with an average ortho-ortho methylene bridge content of about 67% or greater), the process according to the reaction scheme from FIG. 3 produces novolak resins containing ortho-ortho methylene bridge content in excess of 95%. Due to high ortho content, these resins are expected to cure faster and perform well in their applications.

The "very high ortho" phenolic novolak is made by adding slowly an aqueous formaldehyde solution into the refluxing mixture of phenol and/or an alkyl phenol, toluene and an ortho directing catalyst, such as zinc acetate. The addition of formaldehyde is done in such a way that the water present in the formaldehyde and generated by the reaction is continuously removed from the reaction mixture as an azeotrope. The operation facilitates the production of the high ortho novolak. After the complete formaldehyde reaction with phenol, the solvent is removed by atmospheric and vacuum distillation conditions. The p–p' content of the resulting resin is approximately 1.0% or less.

Following the synthesis of the phenolic novolak, a highly reactive methylene acceptor such as resorcinol, resorcinol derivative, a meta-substituted phenol, a resorcinol-formaldehyde novolak resin or a modified resorcinolic novolak resin can be added to make a blend that can be used as the methylene acceptor resins.

Typically, the methylene acceptor is incorporated into the rubber component in an amount ranging from 1 to 25 parts by weight based on 100 parts by weight of the rubber component. Preferably, the methylene acceptor is incorporated into the rubber component in an amount from about 1 to 5 phr.

As can be seen, certain aspects of the invention are directed to improvements in the composition and process for adhering rubber to reinforcing materials. The improvements have applicability regardless of whether or not the reinforcing materials are pre-coated or pre-reacted with adhesive materials. Examples of suitable reinforcing materials include, but are not limited to, nylon, rayon, polyester, aramid, fiberglass, steel (brass, zinc or bronze plated) and other organic or inorganic compositions. The reinforcing materials may be in the form of filaments, fibers, cords or fabrics.

Following the formation of the rubber component, vulcanization can be carried out by the methods known in the art.

It is understood that the resin or reaction product formed by the reaction of the methylene acceptor and methylene donor promotes the adhesion between the rubber and the reinforcing materials while simultaneously providing an improvement in the rubber vulcanizate properties such as hardness, dynamic stiffness and low hysteresis properties.

The rubber compositions based on the above resins may be used in the preparation of composite products for the manufacture of tires, power belts, conveyor belts, printing rolls, rubber shoe heels and soles, rubber wringers, automobile floor mats, mud flaps for trucks, ball mill liners, and the like. Preferably, the rubber vulcanizates are used in wire coat compounds, carcass ply or overlay compounds for tires.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLE 1

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of p-toluenesulfonic acid catalyst (PTSA) were charged and heated to 90–95° C. Then, 83.9 grams of an aqueous formaldehyde solution (37.6 wt. %; 1.05 mole) were added slowly for a period of about 60 minutes. After the formaldehyde addition, the reactor contents were stirred under reflux conditions for about 180 minutes. Then, the PTSA catalyst was neutralized by the addition of 0.5 gram of aqueous sodium hydroxide solution (50 wt. %). The water present in the reactor was then removed first by atmospheric distillation to 150–155° C. and later by applying vacuum and holding it for 15 minutes at 155–160° C. and under 26–28 inches of Hg vacuum. After this distillation, vacuum was released and the reflux condenser was attached again. An aqueous solution of resorcinol-formaldehyde novolak resin (49.9 wt. %; 185.7 grams), commercially available as Penacolite® Resin R-50, from Indspec Chemical Corporation, Pittsburgh, Pa., was added slowly over a period of 30–90 minutes into the reactor with good stirring. Atmospheric and vacuum distillations were carried out once again to remove the water distillate to obtain a phenolic and resorcinolic novolak resin blend having a softening point of 104.9° C.

Liquid chromatographic (LC) and gas chromatographic (GC) analyses showed that this resin contained 0.8 wt. % phenol, 2.8 wt. % t-octylphenol and 7.0 wt. % resorcinol as the unreacted free monomers. H-NMR spectroscopic analysis of this resin indicated the molar ratio of the total resorcinolic structures to the total phenolic structures was about 39/61. Also, the determination of the methylene bridge distribution by carbon-13 NMR ($^{13}$C NMR) analysis has shown that the resin contained approximately 15% p–p' phenolic; 33% o–p' phenolic; 39% o–o' phenolic and 4–4' resorcinolic; 12% 2–4' resorcinolic; and 1% 2–2' resorcinolic methylene bridges.

EXAMPLE 2

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of zinc acetate catalyst were charged and heated to 35–45° C. Then, 59.9 grams of an aqueous formaldehyde (first) solution (37.6 wt. %; 0.75 mole) were added slowly for a period of about 10–15 minutes. After the formaldehyde addition, the reactor contents were stirred under reflux for about 90–180 minutes. Then, 24.0 grams of formaldehyde solution (second) (37.6 wt. %; 0.30 mole) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. The high ortho phenolic novolak resin thus produced had a softening point of 108.7° C.

LC/GC analyses showed that this resin contained 2.6 wt. % phenol and 1.3 wt. % t-octylphenol as the unreacted free monomers. Also, the determination of the methylene bridge distribution by $^{13}$C NMR analysis showed that the resin contained approximately 3% p–p' phenolic, 30% o–p' phenolic and 67% o–o' phenolic methylene bridges.

EXAMPLE 3

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of zinc acetate catalyst were charged and heated to 35–45° C. Then, 59.9 grams of an aqueous formaldehyde (first) solution (37.6 wt. %; 0.75 mole) were added slowly for a period of about 10–15 minutes. After the formaldehyde addition, the reactor contents were stirred under reflux for about 90–180 minutes. Then, 24.0 grams of formaldehyde solution (second) (37.6 wt. %; 0.30 mole) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. After this distillation, vacuum was released and the reflux condenser was attached again. An aqueous solution of resorcinol-formaldehyde novolak resin (49.9 wt. %; 185.7 grams), commercially available as Penacolite® Resin R-50 from Indspec Chemical Corporation, was added slowly over a period of 30–90 minutes into the reactor with good stirring. Atmospheric and vacuum distillations were carried out once again to remove the water distillate to obtain a phenolic and resorcinolic novolak resin blend having a softening point of 116.5° C.

LC/GC analyses showed that this resin contained 0.47 wt. % phenol, 0.57 wt. % t-octylphenol and 8.6 wt. % resorcinol as the unreacted free monomers. H-NMR spectroscopic analysis of this resin indicated the molar ratio of the total resorcinolic structures to the total phenolic structures was about 47/53. Also, the determination of the methylene bridge distribution by $^{13}$C NMR analysis has shown that the resin contained approximately 2% p–p' phenolic; 16% o–p' phenolic; 64% o–o' phenolic and 4–4' resorcinolic; 16% 2–4' resorcinolic; and 2% 2–2' resorcinolic methylene bridges.

EXAMPLE 4

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of zinc acetate catalyst were charged and heated to 35–45° C. Then, 59.9 grams of an aqueous formaldehyde (first) solution (37.6 wt. %; 0.75 mole) were added slowly for a period of about 10–15 minutes. After the formaldehyde addition, the reactor contents were stirred under reflux for about 90–180 minutes. Then, 24.0 grams of formaldehyde solution (second) (37.6 wt. %; 0.30 mole) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. After this distillation, vacuum was released and the reflux condenser was attached again. An aqueous solution of resorcinol-formaldehyde novolak resin (49.9 wt. %; 185.7 grams), commercially available as Penacolite® Resin R-50 from Indspec Chemical Corporation, was added slowly over a period of 30–90 minutes into the reactor with good stirring. Atmospheric and vacuum distillations were carried out once again to remove the water distillate to obtain a phenolic and resorcinolic novolak resin blend having a softening point of 117.5° C.

LC/GC analyses showed that this resin contained 0.38 wt. % phenol, 0.62 wt. % t-octylphenol and 5.8 wt. % resorcinol as the unreacted free monomers. Proton nuclear magnetic resonance (NMR) spectroscopic analysis of this resin indicated the molar ratio of the total resorcinolic structures to the total phenolic structures was about 38/62. Also, the determination of the methylene bridge distribution by $^{13}$C NMR analysis has shown that the resin contained approximately 2% p–p' phenolic; 21% o–p' phenolic; 63% o–o' phenolic and 4–4' resorcinolic; 13% 2–4' resorcinolic; and 1% 2–2' resorcinolic methylene bridges.

EXAMPLE 5

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of zinc acetate catalyst were charged and heated to 35–45° C. Then, 59.9 grams of an aqueous formaldehyde (first) solution (37.6 wt. %; 0.75 mole) were added slowly for a period of about 10–15 minutes. After the formaldehyde addition, the reactor contents were stirred under reflux for about 90–180 minutes. Then, 24.0 grams of formaldehyde solution (second) (37.6 wt. %; 0.30 mole) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. After this distillation, vacuum was released and the reflux condenser was attached again. An aqueous solution of resorcinol-formaldehyde novolak resin (49.9 wt. %; 185.7 grams), commercially available as Penacolite® Resin R-50 from Indspec Chemical Corporation, was added slowly over a period of 30–90 minutes into the reactor with good stirring. Atmospheric and vacuum distillations were carried out once again to remove the water distillate to obtain a phenolic and resorcinolic novolak resin blend having a softening point of 116° C.

LC/GC analyses showed that this resin contained 0.55 wt. % phenol, 0.79 wt. % t-octylphenol and 4.7 wt. % resorcinol as the unreacted free monomers. H-NMR spectroscopic analysis of this resin indicated the molar ratio of the total resorcinolic structures to the total phenolic structures was about 29/71. Also, the determination of the methylene bridge distribution by $^{13}C$ NMR analysis has shown that the resin contained approximately 2% p–p' phenolic; 20% o–p' phenolic; 68% o–o' phenolic and 4–4' resorcinolic; 9% 2–4' resorcinolic; and 1% 2–2' resorcinolic methylene bridges.

EXAMPLE 6

The methylene acceptor resins prepared according to examples 3, 4, and 5 following the reaction scheme outlined in FIG. 1 were evaluated in a black natural rubber compound to assess and compare their performance against resorcinol for steel-wire adhesion and cured rubber compound dynamic properties. Black natural rubber compositions, having the formulation shown in Table 1, were prepared in a 3-stage mixing procedure. These rubber compositions were then used to evaluate the adhesion and reinforcing effects of the resorcinol compounds of this invention as methylene acceptors in combination with the methylene donor hexamethoxymethylmelamine (HMMM). The methylene donor/acceptor ratio was kept at 1:1 for resorcinol and at 2:3 for the methylene acceptor of this invention with a combined loading of 5 parts by weight in the rubber compound.

TABLE 1

Rubber Compound Used in Testing

| Master Batch | Parts by Weight |
|---|---|
| First Stage | |
| 1. Natural Rubber | 100 |
| 2. Carbon Black | 55 |
| 3. Zinc Oxide | 8 |
| 4. Stearic Acid | 1 |
| 5. N-(1,2-Dimethylbutyl)-N'-Phenyl-p-Phenylene Diamine | 2 |
| 6. Pre-Vulcanization Inhibitor [N-(Cyclohexylthio) Phthalimide] | 0.2 |
| 7. Polymerized 1,2-Dihydro-2,2,4-Trimethyl Quinoline | 1 |
| Second Stage | |
| 8. Methylene Acceptor (Resorcinol/Resins) | 2.5/3 |
| 9. Cobalt Salt (Monobond 680C, 22% Co) | 0.45 |
| Third Stage (Final) | |
| 10. Insoluble Sulfur | 7.5 |
| 11. N,N-Dicylohexyl-2-Benzenethiazole Sulfenamide | 1 |
| 12. Methylene Donor (HMMM, 72% Active) | 2.5/2 |

The rubber masterbatch was mixed in the first stage to about 150° C. in a Banbury mixer. In a second stage, a methylene acceptor prepared according to the methods of this invention and a cobalt salt were mixed into an appropriate amount of masterbatch on the two roll mill at about 121° C. The insoluble sulfur, accelerator and appropriate amount of HMMM as indicated in Table 1 were mixed in the third stage at 95° C. The test compounds were conditioned overnight in a constant temperature room at about 23° C. The compounds were then tested for Rheometer cure, shaped and optimum cured at 150° C. for the evaluation of wire adhesion and mechanical properties.

Cure properties were measured with an Alpha Technologies MDR Rheometer at 150° C., 0.5° arc and 1.67 Hz according to ASTM D-5289. Wire pullout adhesion was determined for each test compound by ASTM D-2229 using brass plated steel cord with 63.7% copper plating embedded 19 mm into the rubber pad. Dynamic mechanical properties were determined with a Rheometrics Scientific mechanical spectrometer at 0.2% and 2% torsional shear strain at 1 Hz and 23° C. Dynamic stiffness G' was measured at 0.2% strain and tangent delta, an indicator of compound hysteresis or heat buildup, was measured at 2% strain. The fuming test was a visual test on a scale of 0 to 3, during the second mixing stage. If there is absolutely no fuming, it is rated as "0". The fuming of resorcinol in the mixture is rated as "3".

The softening point of the resins was measured according to the following method with reference to the latest edition of ASTM E 28 and ASTM D 3104, which are incorporated by reference herein in their entirety.

Apparatus: cups—pitch type drilled to 0.257" Opening (F drill); a 440 stainless steel ball (0.2500" in diameter and must pass through cups); a Mettler softening point apparatus comprising (1) a control unit Model FP-90 or equivalent, (2) a furnace Model FP-83 or equivalent, and (3) cartridge assemblies; a timer; porcelain evaporating dishes (about 3" in diameter); and a hot plate. For calibration of the Mettler apparatus, see ASTM D 3104, which is incorporated by reference herein.

Procedures: melt 15 grams of resin in a porcelain or aluminum evaporating dish. At 600–650° F., surface temperature of hot plate, melting time is approximately 4 minutes. Overheating should be avoided. When the resin is melted, pour into cups that have been preheated to at least the temperature of the molten resin. The quantity of resin poured into the cups should be such that after solidification the excess can be removed with a heated spatula or putty knife. An aluminum plate with holes drilled in it to form a support on the sides and bottom of the cup can be used, or they can be held with forceps when removing excess resin. After the samples have been cooled to room temperature in a desiccator, assemble the cartridge so that the ball rests on the top of the resin. Place the assembled cartridge in the furnace, which has been preset to 85° C. or 10–15° C. below the expected soft point. Set the heating rate at 1° C./min. Turn the cartridge until it locks into position, and wait 30 seconds. Then, initiate operation of softening point apparatus. Read the completed softening point on the indicator. Duplicate determinations should not differ by more than 1.0° C.

Table 2 illustrates the cure behavior, wire adhesion, physical and mechanical properties of cured rubber compounds for resorcinol control and the methylene acceptor resins of Examples 3, 4, and 5.

TABLE 2

Rubber Compound Properties of High Ortho Novolak and Resorcinol Novolak Resin Blends

| Compound Methylene Acceptor | Control Resorcinol | Example 3 | Example 4 | Example 5 |
|---|---|---|---|---|
| Methylene Donor | HMMM | HMMM | HMMM | HMMM |
| Weight Ratio of Acceptor/Donor, phr | 2.5/2.5 | 3.0/2.0 | 3.0/2.0 | 3.0/2.0 |
| Fuming at 120° C. | 3 | 0.5 | 1 | 0.5 |
| Rheometer Cure at 150° C. | | | | |
| $M_H$, dN-m | 37.74 | 37.56 | 38.06 | 39.27 |
| $M_L$, dN-m | 2.43 | 2.95 | 2.98 | 2.94 |
| ts2, Minutes | 3.11 | 2.69 | 2.86 | 2.9 |
| t90, Minutes | 17.1 | 19.1 | 20 | 21 |
| Steel Wire Adhesion, N (% Rubber Coverage) | | | | |
| (t' 100 + 7 Cure; BW95 Wire: 3 × 0.2 + 6 × 0.35, 63.72% Cu) | | | | |
| Unaged | 983(80) | 1084(85) | 1048(85) | 1136(85) |
| Steam, 24 Hours at 120° C. | 1282(95) | 1366(95) | 1384(95) | 1353(95) |
| Humidity, 21 Days at 85° C./95% RH | 1237(90) | 1221(90) | 1178(90) | 1203(90) |

TABLE 2-continued

Rubber Compound Properties of High Ortho Novolak and Resorcinol Novolak Resin Blends

| Compound<br>Methylene Acceptor | Control<br>Resorcinol | Example 3 | Example 4 | Example 5 |
|---|---|---|---|---|
| Dynamic Mechanical | | | | |
| (Strain Sweep, 1 Hz and 23° C.) | | | | |
| 0.2% Strain | | | | |
| G', MPa | 23.5 | 26.57 | 27.16 | 27.8 |
| Tan Delta | 0.079 | 0.074 | 0.073 | 0.071 |
| 2.0% Strain | | | | |
| G', MPa | 13.69 | 16.35 | 16.97 | 17.6 |
| Tan Delta | 0.212 | 0.196 | 0.192 | 0.187 |
| Short A Hardness | 82 | 85 | 85 | 87 |
| Tensile Properties | | | | |
| 100% Modulus, MPa | 4.83 | 4.89 | 4.7 | 5.18 |
| Tensile Strength, MPa | 26.3 | 25.7 | 25.2 | 26.7 |
| Elongation, % | 472 | 447 | 444 | 462 |
| Die-C Tear, KN/m | 101 | 104 | 110 | 100 |

It is clear from Table 2 that the methylene acceptors in accordance with embodiments of the invention are less fuming compared to resorcinol. Scorch time (ts2 in Rheometer cure), which is an indicator of the reactivity of the methylene acceptor during the earlier stage of the curing process, is lower for the methylene acceptors compared to resorcinol. These data suggest that the reactivity of the resin blends exceeds the resorcinol reactivity. This is a direct indication that the high ortho phenolic novolak resin modified resorcinolic resins have good reactivity for the methylene donor reaction during the rubber compound curing.

Steel wire unaged and aged adhesion data also suggest that the resins show performances either similar to or better than resorcinol as the methylene acceptor.

EXAMPLE 7

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of zinc acetate catalyst were charged and heated to 35–45° C. Then, 59.9 grams of an aqueous formaldehyde (first) solution (37.6 wt. %; 0.75 mole) were added slowly for a period of about 10–15 minutes. After the formaldehyde addition, the reactor contents were stirred under reflux for about 90–180 minutes. Then, 24.0 grams of formaldehyde solution (second) (37.6 wt. %; 0.30 mole) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. After this distillation, vacuum was released and the reflux condenser was attached again. Resorcinol (114.0 grams; 1.035 mole) was then added into the reactor at 130–150° C. slowly with constant stirring. After this addition, 50.6 grams of an aqueous formaldehyde solution (third) (37.6 wt. %; 0.634 mole) was added for about 45–60 minutes under reflux. Following the third formaldehyde addition, the reactor contents were held at reflux for an additional 30 minutes. Atmospheric and vacuum distillations were carried out once again to remove distillate to obtain a modified phenolic novolak resin with a resorcinolic novolak, produced in-situ from the resorcinol-formaldehyde reaction, having a softening point of 112° C.

LC/GC analyses showed that this resin contained 0.75 wt. % phenol, 0.67 wt. % t-octylphenol and 9.7 wt. % resorcinol as the unreacted free monomers. H-NMR spectroscopic analysis of this resin indicated the molar ratio of the total resorcinolic structures to the total phenolic structures was about 46/54. Also, the determination of the methylene bridge distribution by $^{13}$C NMR analysis has shown that the resin contained approximately 2% p–p' phenolic; 20% o–p' phenolic; 68% o–o' phenolic and 4–4' resorcinolic; 9% 2–4' resorcinolic; and 1% 2–2' resorcinolic methylene bridges.

EXAMPLE 8

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of zinc acetate catalyst were charged and heated to 35–45° C. Then, 59.9 grams of an aqueous formaldehyde (first) solution (37.6 wt. %; 0.75 mole) were added slowly for a period of about 10–15 minutes. After the formaldehyde addition, the reactor contents were stirred under reflux for about 90–180 minutes. Then, 24.0 grams of formaldehyde solution (second) (37.6 wt. %; 0.30 mole) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. After this distillation, vacuum was released and the reflux condenser was attached again. Resorcinol (79.4 grams; 0.721 mole) was then added into the reactor at 130–150° C. slowly with constant stirring. After this addition, 35.3 grams of an aqueous formaldehyde solution (third) (37.6 wt. %; 0.442 mole) was added for about 45–60 minutes under reflux. Following the third formaldehyde addition, the reactor contents were held at reflux for an additional 30 minutes. Atmospheric and vacuum distillations were carried out once again to remove distillate to obtain a modified phenolic novolak resin with a resorcinolic novolak, produced in-situ from the resorcinol-formaldehyde reaction, having a softening point of 110.5° C.

LC/GC analyses showed that this resin contained 0.7 wt. % phenol, 0.69 wt. % t-octylphenol and 8.2 wt. % resorcinol as the unreacted free monomers. H-NMR spectroscopic analysis of this resin indicated the molar ratio of the total resorcinolic structures to the total phenolic structures was about 38/62. Also, the determination of the methylene bridge distribution by $^{13}$C NMR analysis has shown that the resin contained approximately 2% p–p' phenolic; 22% o–p' phenolic; 70% o–o' phenolic and 4–4' resorcinolic; 6% 2–4' resorcinolic; and less than about 1% 2–2' resorcinolic methylene bridges.

EXAMPLE 9

Into a 1-liter reaction kettle equipped with a stirrer, thermometer, reflux condenser and an addition funnel, 128.3 grams of phenol (1.35 mole), 21.3 grams of t-octylphenol (0.10 mole) and 1.0 gram of zinc acetate catalyst were charged and heated to 35–45° C. Then, 59.9 grams of an aqueous formaldehyde (first) solution (37.6 wt. %; 0.75 mole) were added slowly for a period of about 10–15 minutes. After the formaldehyde addition, the reactor contents were stirred under reflux for about 90–180 minutes. Then, 24.0 grams of formaldehyde solution (second) (37.6 wt. %; 0.30 mole) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. After this distillation, vacuum was released and the reflux condenser was attached again. Resorcinol (51.1 grams; 0.464 mole) was then added into the reactor at 130–150° C. slowly with constant stirring. After this addition, 22.7 grams of an aqueous formaldehyde solution (third) (37.6 wt. %; 0.284 mole) was added for about 45–60 minutes under reflux. Following the third formaldehyde addition, the reactor contents were held at reflux for an additional 30 minutes. Atmospheric and vacuum distillations were carried out once again to remove distillate to obtain a modified phenolic novolak resin with a resorcinolic novolak, produced in-situ from the resorcinol-formaldehyde reaction, having a softening point of 112.4° C.

LC/GC analyses showed that this resin contained 0.16 wt. % phenol, 0.39 wt. % t-octylphenol and 5.9 wt. % resorcinol as the unreacted free monomers. H-NMR spectroscopic analysis of this resin indicated the molar ratio of the total resorcinolic structures to the total phenolic structures was about 28/72. Also, the determination of the methylene bridge distribution by $^{13}C$ NMR analysis has shown that the resin contained approximately 1% p–p' phenolic; 17% o–p' phenolic; 78% o–o' phenolic and 4–4' resorcinolic; 4% 2–4' resorcinolic; and less than 1% 2–2' resorcinolic methylene bridges.

EXAMPLE 10

The methylene acceptor resins prepared according to examples 7, 8, and 9 following the reaction scheme outlined in FIG. 2 were evaluated in a black natural rubber compound to assess and compare their performance against resorcinol for steel-wire adhesion and cured rubber compound dynamic properties. Black natural rubber compositions, having the formulation shown in Table 1, were prepared in a 3-stage mixing procedure as described in Example 6. These rubber compositions were then used to evaluate the adhesion and reinforcing effects of the resorcinol compounds of this invention as methylene acceptors in combination with the methylene donor hexamethoxymethylmelamine(HMMM). The methylene donor/acceptor ratio was kept at 1:1 for resorcinol and at 2:3 for the methylene acceptor of this invention with a combined loading of 5 parts by weight in the rubber compound.

Testing and rubber compound properties were evaluated as similar to the procedure and conditions outlined in Example 6.

Table 3 illustrates the cure behavior, wire adhesion, physical and mechanical properties of cured rubber compounds for resorcinol control and the methylene acceptor resins of Examples 7, 8, and 9.

TABLE 3

Rubber Compound Properties of High Ortho Novolak and Resorcinol/Formaldehyde Reaction Product Blends

| Compound Methylene Acceptor | Control Resorcinol | Example 7 | Example 8 | Example 9 |
|---|---|---|---|---|
| Methylene Donor | HMMM | HMMM | HMMM | HMMM |
| Weight Ratio of Acceptor/Donor, phr | 2.5/2.5 | 3.0/2.0 | 3.0/2.0 | 3.0/2.0 |
| Fuming at 120° C. | 3 | 0 | 0.5 | 0.5 |
| Rheometer Cure at 150° C. | | | | |
| $M_H$, dN-m | 37.55 | 34.57 | 33.74 | 35.85 |
| $M_L$, dN-m | 2.44 | 2.66 | 2.62 | 2.83 |
| ts2, Minutes | 3.19 | 3.4 | 3.56 | 3.06 |
| t90, Minutes | 16.1 | 19.9 | 21.1 | 22.4 |
| Steel Wire Adhesion, N (% Rubber Coverage) | | | | |
| (t' 100 + 7 Cure; BW95 Wire: 3 × 0.2 + 6 × 0.35, 63.72% Cu) | | | | |
| Unaged | 1080(80) | 1053(80) | 1075(85) | 1140(90) |
| Steam, 24 Hours at 120° C. | 1296(95) | 1350(95) | 1346(95) | 1352(95) |
| Humidity, 21 Days at 85° C./95% RH | 1195(90) | 1253(90) | 1247(90) | 1276(90) |
| Dynamic Mechanical | | | | |
| (Strain Sweep, 1 Hz and 23° C.) | | | | |
| 0.2% Strain | | | | |
| G', MPa | 22.81 | 25.54 | 26.03 | 27.45 |
| Tan Delta | 0.076 | 0.074 | 0.072 | 0.07 |
| 2.0% Strain | | | | |
| G', MPa | 13.43 | 15.82 | 16.3 | 17.22 |
| Tan Delta | 0.208 | 0.195 | 0.192 | 0.19 |
| Shore A Hardness | 82 | 84 | 85 | 85 |
| Tensile Properties | | | | |
| 100% Modulus, MPa | 4.85 | 4.65 | 4.89 | 4.9 |
| Tensile Strength, MPa | 25.5 | 25.5 | 25.5 | 25.9 |
| Elongation, % | 452 | 451 | 453 | 460 |
| Die-C Tear, KN/m | 107 | 98 | 107 | 106 |

Steel wire unaged and aged adhesion data also suggest that the resins of Examples 7–9 show performances either similar to or better than resorcinol as the methylene acceptor.

From the dynamic mechanical test results set forth in Table 3, the improved hardness, dynamic storage modulus (G') and low hysteresis (tan delta) were observed for compounds made from the resins of Examples 7, 8, and 9 versus a compound using resorcinol,

EXAMPLE 11

Into a 1-liter reaction kettle equipped with a stirrer, thermometer, Dean-Stark reflux condenser and an addition funnel, 128.3 grams of phenol (1.35 mole), 21.3 grams of t-octylphenol (0.10 mole), 50 grams of toluene and 1.0 gram of zinc acetate catalyst were charged and heated to 135–145° C. Then, 83.9 grams of an aqueous formaldehyde solution (37.6 wt. %; 1.05 mole) were added very slowly in such a way that the azeotrope water was collected continuously and removed periodically from the Dean-Stark. The formaldehyde addition was continued for 240–360 minutes. After the formaldehyde addition, the reactor contents were stirred under reflux further for about 60–180 minutes. The toluene and water present in the reactor were then removed first by atmospheric distillation to 150–155° C. and later by applying vacuum and holding it for 60–120 minutes at 155–160° C. and under 26–28 inches of Hg vacuum to obtain a very high ortho substituted phenolic novolak resin having a softening point of 81.5° C.

LC/GC analyses showed that this resin contained 0.07 wt. % phenol and 2 wt. % t-octylphenol as the unreacted free monomers. Also, the determination of the methylene bridge distribution by $^{13}$C NMR analysis has shown that the resin contained approximately less than 1% p–p' phenolic, 4% o–p' phenolic, 96% o–o' phenolic methylene bridges.

EXAMPLE 12

Into a 1-liter reaction kettle equipped with a stirrer, thermometer, Dean-Stark reflux condenser and an addition funnel, 128.3 grams of phenol (1.35 mole), 21.3 grams of t-octylphenol (0.10 mole), 50 grams of toluene and 1.0 gram of zinc acetate catalyst were charged and heated to 135–145° C. Then, 83.9 grams of an aqueous formaldehyde solution (37.6 wt. %; 1.05 mole) were added very slowly in such a way that the azeotrope water was collected continuously and removed periodically from the Dean-Stark. The formaldehyde addition was continued for 240–360 minutes. After the formaldehyde addition, the reactor contents were stirred under reflux further for about 60–180 minutes. An aqueous solution of resorcinol-formaldehyde novolak resin (49.9 wt. %; 185.7 grams), commercially available as Penacolite® Resin R-50 from Indspec Chemical Corporation, was added slowly over a period of 30–90 minutes into the reactor with good stirring. The toluene and water present in the reactor were then removed first by atmospheric distillation to 150–155° C. and later by applying vacuum and holding it for 60–120 minutes at 155–160° C. and under 26–28 inches of Hg vacuum to obtain a very high ortho substituted phenolic novolak and resorcinolic novolak resin blend having a softening point of 96.1° C. LC/GC analyses showed that this resin contained 3.6 wt. % phenol, 1.4 wt. % t-octylphenol and 8.4 wt. % resorcinol as the unreacted free monomers. H-NMR spectroscopic analysis of this resin indicated the molar ratio of the total resorcinolic structures to the total phenolic structures was about 48/52. Also, the determination of the methylene bridge distribution by $^{13}$C NMR analysis has shown that the resin contained approximately less than 1% p–p' phenolic; 7% o–p' phenolic; 75% o–o' phenolic and 4–4' resorcinolic; 16% 2–4' resorcinolic; and 2% 2–2' resorcinolic methylene bridges.

EXAMPLE 13

Into a 1-liter reaction kettle equipped with a stirrer, thermometer, Dean-Stark reflux condenser and an addition funnel, 128.3 grams of phenol (1.35 mole), 21.3 grams of t-octylphenol (0.10 mole), 50 grams of toluene and 1.0 gram of zinc acetate catalyst were charged and heated to 135–145° C. Then, 83.9 grams of an aqueous formaldehyde solution (37.6 wt. %; 1.05 mole) were added very slowly in such a way that the azeotrope water was collected continuously and removed periodically from the Dean-Stark. The formaldehyde addition was continued for 240–360 minutes. After the formaldehyde addition, the reactor contents were stirred under reflux further for about 60–180 minutes. An aqueous solution of resorcinol-formaldehyde novolak resin (49.9 wt. %; 185.7 grams), commercially available as Penacolite® Resin R-50 from Indspec Chemical Corporation, was added slowly over a period of 30–90 minutes into the reactor with good stirring. The toluene and water present in the reactor were then removed first by atmospheric distillation to 150–155° C. and later by applying vacuum and holding it for 60–120 minutes at 155–160° C. and under 26–28 inches of Hg vacuum to obtain a very high ortho substituted phenolic novolak and resorcinolic novolak resin blend having a softening point of 97.2° C.

LC/GC analyses showed that this resin contained 0.4 wt. % phenol, 1.6 wt. % t-octylphenol and 6.8 wt. % resorcinol as the unreacted free monomers. H-NMR spectroscopic analysis of this resin indicated the molar ratio of the total resorcinolic structures to the total phenolic structures was about 37/63. Also, the determination of the methylene bridge distribution by $^{13}$C NMR analysis has shown that the resin contained approximately less than 1% p–p' phenolic; 8% o–p' phenolic; 77% o–o' phenolic and 4–4' resorcinolic; 13% 2–4' resorcinolic; and 2% 2–2' resorcinolic methylene bridges.

EXAMPLE 14

The methylene acceptor resins prepared according to examples 12 and 13 following the reaction scheme outlined in FIG. 3 were evaluated in a black natural rubber compound to assess and compare their performance against Penacolite® Resin B-19-M for steel-wire adhesion and cured rubber compound dynamic properties. Penacolite® B-19-M resin is a high performance resin commercially available from INDSPEC Chemical Corp. This resin contains resorcinolic oligomers which are responsible for its high performance in rubber compounding applications. Black natural rubber compositions, having the formulation shown in Table 1, were prepared in a 3-stage mixing procedure. These rubber compositions were then used to evaluate the adhesion and reinforcing effects of the resorcinolic resin compounds as methylene acceptors in combination with the methylene donor hexamethoxymethylmelamine(HMMM). The methylene donor/acceptor ratio was kept at 2:3 for the methylene acceptor of this invention with a combined loading of 5 parts by weight in the rubber compound.

Testing and rubber compound properties were evaluated as similar to the procedure and conditions outlined in Example 6.

Table 4 illustrates the cure behavior, wire adhesion, physical and mechanical properties of cured rubber compounds for Penacolite® B-19-M (control) and the methylene acceptor resins of Examples 12 and 13.

TABLE 4

Rubber Compound Properties of Very High Ortho Novolak and Resorcinolic Novolak Resin Blends

| Compound Methylene Acceptor | Control Penacolite ® Resin B-19-M | Example 12 | Example 13 |
|---|---|---|---|
| Methylene Donor | HMMM | HMMM | HMMM |
| Weight Ratio of Acceptor/Donor, phr | 3.0/2.0 | 3.0/2.0 | 3.0/2.0 |
| Fuming at 120° C. | 2 | 2 | 2 |
| Mooney Viscosity-212F (ML 1 + 4) | 64 | 64 | 63 |
| Rheometer Cure at 150° C. | | | |
| $M_H$, dN-m | 37.7 | 36.7 | 37.4 |
| $M_L$, dN-m | 3.04 | 2.79 | 2.76 |
| ts2, Minutes | 2.3 | 2.65 | 2.85 |
| t90, Minutes | 16.4 | 17.7 | 18.9 |

TABLE 4-continued

Rubber Compound Properties of Very High Ortho Novolak and Resorcinolic Novolak Resin Blends

| Compound Methylene Acceptor | Control Penacolite ® Resin B-19-M | Example 12 | Example 13 |
|---|---|---|---|
| Steel Wire Adhesion, N (% Rubber Coverage) | | | |
| (t' 100 + 7 Cure; BW95 Wire: 3 × 0.2 + 6 × 0.35, 63.72% Cu) | | | |
| Unaged | 1183(85) | 1243(90) | 1236(90) |
| Steam, 24 Hours at 120° C. | 1434(95) | 1356(95) | 1433(95) |
| Humidity, 21 Days at 85° C./95% RH | 1251(90) | 1251(90) | 1243(90) |
| Dynamic Mechanical | | | |
| (Strain Sweep, 1 Hz and 23° C.) | | | |
| 0.2% Strain | | | |
| G', Mpa | 24.28 | 26.43 | 26.48 |
| Tan Delta | 0.077 | 0.073 | 0.071 |
| 2.0% Strain | | | |
| G', Mpa | 14.59 | 16.1 | 16.45 |
| Tan Delta | 0.204 | 0.201 | 0.194 |
| Shore A Hardness | 83 | 84 | 84 |
| Tensile Properties | | | |
| 100% Modulus, MPa | 4.55 | 4.71 | 4.69 |
| Tensile Strength, Mpa | 26.8 | 26.4 | 26.8 |
| Elongation, % | 463 | 441 | 456 |
| Die-C Tear, KN/m | 110.1 | 104.7 | 106.6 |

It is clear from the Table 4 results that the methylene acceptors of Examples 12–13 have similar fuming compared to B-19-M resin. Cure data comparison suggest that the very high ortho phenolic novolak resin modified resorcinolic resins have good reactivity for the methylene donor reaction during the rubber compound curing.

Steel wire unaged and aged adhesion data also suggest that the resins show performances similar to the high performance Penacolite® B-19-M methylene acceptor resin.

From the dynamic mechanical test results set forth in Table 4, the hardness, dynamic storage modulus (G') and low hysteresis (tan delta) values obtained for compounds made from the resins of Examples 12 and 13 are similar to B-19-M suggesting a replacements for this high performance resin in the rubber compounding applications.

EXAMPLE 15

Into a 4-liter reaction kettle equipped with a stirrer, thermometer, reflux condenser and an addition funnel, 1395.9 grams of phenol (14.85 moles), 242 grams of nonylphenol (1.1 mole) and 11.0 grams of zinc acetate catalyst were charged and heated to 35–45° C. Then, 668.8 grams of an aqueous formaldehyde (first) solution (37.0 wt. %; 8.25 moles) were added slowly for a period of about 10–15 minutes. After the formaldehyde addition, the reactor contents were stirred under reflux for about 90–180 minutes. Then, 267.3 grams of formaldehyde solution (second) (37.0 wt. %; 3.3 moles) were added into the reactor for a period of 15–30 minutes at 85–95° C. The reactor contents were again heated to reflux for an additional period of 90–180 minutes. A distillation set up was made and the water distillate was collected until the temperature of the reactor reached 125–130° C. under atmospheric conditions. After this, once again the reactor contents were stirred under reflux for 60–120 minutes. The water present in the reactor was then removed first by atmospheric distillation to 150–155° C. and later by applying vacuum and holding it for 15 minutes at 155–160° C. and under 26–28 inches of Hg vacuum. The high ortho phenolic novolak resin thus produced had a softening point of 112.1° C.

LC/GC analyses showed that this resin contained 0.4 wt. % phenol and 1.5 wt. % nonylphenol as the unreacted free monomers. Also, the determination of the methylene bridge distribution by $^{13}C$ NMR analysis has shown that the resin contained approximately 9% p–p' phenolic, 29% o–p' phenolic and 62% o–o' phenolic methylene bridges.

As demonstrated above, embodiments of the invention provide various relatively high ortho-ortho bonded phenolic novolak modified resorcinol resins. These resins are particularly useful as bonding and stiffening agents in the production of rubber compositions, imparting improved physical and mechanical properties such as low volatility, reduced fuming during rubber compounding, improved adhesion of tire cords to vulcanized rubber, high dynamic storage modulus and low hysteresis.

While the invention has been described with respect to a limited number of embodiments, the specific features of one embodiment should not be attributed to other embodiments of the invention. No single embodiment is representative of all aspects of the invention. In some embodiments, the compositions may include numerous compounds not mentioned herein. In other embodiments, the compositions do not include, or are substantially free of, any compounds not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A vulcanizable rubber composition comprising (I) a rubber component selected from natural rubber, synthetic rubber or combinations thereof; (II) a methylene donor compound which generates formaldehyde upon heating,; and (III) a methylene acceptor compound comprising a phenolic and resorcinolic novolak resin blend represented by the following structures:

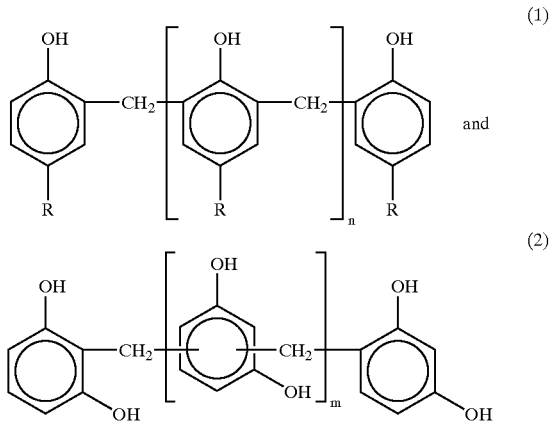

where n is equal to or greater than 1, m is equal to or greater than 1, and R is selected from the group consisting of H, an alkyl group chain of 1–16 carbon atoms and an aralkyl group of 8–12 carbon atoms, wherein the phenolic resin of formula (I) comprises methylene linkages characterized by at least 40 percent ortho-ortho bonding.

2. The vulcanizable rubber composition of claim 1, wherein the phenolic and resorcinolic novolak resin blend has a weight ratio of phenolic resin to resorcinolic resin between about 95:5 to 5:95.

3. The vulcanizable rubber composition of claim 1, wherein the phenolic and resorcinolic novolak resin blend is prepared by prepared by (a) reacting one or more phenolic compounds represented by the following formula:

where R is selected from the group consisting of H, an alkyl group chain of 1–16 carbon atoms and an aralkyl group of 8–12 carbon atoms with an aldehyde in the presence of an ortho directing catalyst and (b) combining with a resorcinol-formaldehyde novolak resin.

4. The vulcanizable rubber composition of claim 1, wherein the phenolic novolak resin comprise methylene linkages characterized by at least 50 percent ortho-ortho bonding.

5. The vulcanizable rubber composition of claim 1, wherein the methylene acceptor is prepared by reacting (A) phenol and/or an alkyl phenol with (B) an aldehyde in the presence of (C) an ortho directing divalent metal salt catalyst to produce a high ortho phenolic novolak products containing at least 40% ortho-ortho phenolic methylene bridges and then (D) adding resorcinol or resorcinolic derivative or a meta-substituted phenol and then (E) reacting with an additional amount of an aldehyde.

6. The vulcanizable rubber composition of claim 5, wherein the resin blend comprises the following structures:

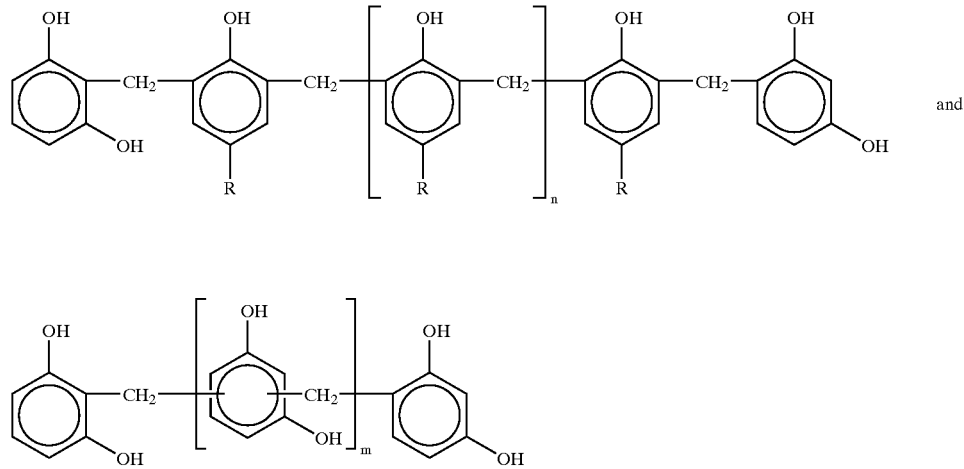

where n is equal to or greater than 1, and m is equal to or greater than 1.

7. The vulcanizable rubber composition of claim 5, wherein the molar ratio of phenol and/or alkylphenol to formaldehyde is about 1/0.4 to 1/0.86.

8. The vulcanizable rubber composition of claim 5, wherein the molar ratio of resorcinol or resorcinol derivative or m-substituted phenol to formaldehyde is about 1/0.4 to 1/0.7.

9. The vulcanizable rubber composition of claim 5, wherein the alkyl phenol is used to prepare the phenolic novolak resin, and the resin comprises o–o' methylene linkage in the range of about 40 to 70%.

10. The vulcanizable rubber composition of claim 5, wherein the alkyl phenol used to prepare the phenolic novolak is selected from para substituted alkyl chain containing 1 to 16 carbon atoms or aralkyl substituted phenols selected from the group consisting of p-cresol, p-tert-butyl-phenol, p-tert-octyl phenol, p-tert-butyl-phenol, p-tert-octyl phenol, p-tert-nonylphenol, p-nonylphenol, p-styrylphenol, p-ethylphenol, and a mixture thereof.

11. The vulcanizable rubber composition of claim 5, wherein the molar ratio of phenol and/or alkylphenol to aldehyde is between about 0.1:0.9 and about 0.9:0.1.

12. The vulcanizable rubber composition of claim 5, wherein the aldehyde is formaldehyde, acetaldehyde, propionaldehyde, butyraldehyde, isobutyraldehyde, valeraldehyde, crotonoaldehyde, benzaldehyde, furfural, or a mixture thereof.

13. The vulcanizable rubber composition of claim 5, wherein the resorcinolic derivative or meta-substituted phenol is selected from the group consisting of 2,4-dihydroxy benzophenone, 2,4-dihydroxy acetophenone, 4-styryl resorcinol, m-cresol, cashew nut shell liquid, phloroglucinol, 3-methyl-5-ethyl phenol, meta-isopropyl phenol, m-isoctyl phenol, ad 3,5-dimethyl phenol, and a mixture thereof.

14. The vulcanizable rubber composition of claim 1, wherein the methylene acceptor is prepared by reacting (A) one or more phenolic compounds represented by the following formula:

where R is selected from the group consisting of H an alkyl chain of $C_1$–$C_{16}$ carbon atoms and an aralkyl group of $C_8$–$C_{12}$ carbon atoms with (B) an aldehyde in the presence of (C) an azeotroping solvent and (D) an ortho directing catalyst comprising a divalent electropositive metal compound selected from the group consisting of oxides, hydroxides, formates, lactates, acetates, benzoates, and mixture of calcium, barium, strontium, magnesium, zinc, manganese, cobalt and lead; (E) then adding resorcinol or resorcinolic derivative or a preformed resorcinol-formaldehyde novolak resin.

15. The vulcanizable rubber composition of claim 1, wherein the methylene linkages are characterized by at least 60 percent ortho-ortho bonding.

16. The vulcanizable rubber composition of claim 1, wherein the methylene acceptor comprises about 90 to about 98% o–o' methylene bridges.

17. The vulcanizable rubber composition of claim 1, wherein the methylene linkages are characterized by at least 85 percent ortho-ortho bonding.

18. The vulcanizable rubber composition of claim 1, wherein the methylene linkages are characterized by at least 95 percent ortho-ortho bonding.

19. The vulcanizable rubber composition of claim 14, wherein the azeotrope solvent is selected from the group consisting of toluene and xylene.

20. The vulcanizable rubber composition of claims 1, further comprising a reinforcing material selected from the group consisting of nylon, rayon, polyester, polyamide, fiberglass, and steel.

21. The vulcanizable rubber composition of claims 1, wherein the rubber composition is used in preparation of composite products for the manufacture of tires, power belts, conveyor belts, printing rolls, automobile floor mats, mud flaps for trucks or ball mill liners.

22. A vulcanizable rubber composition, comprising: (I) a rubber component selected from natural rubber, synthetic rubber or combinations thereof, and (II) a methylene donor compound which generates formaldehyde upon heating, and (III) a methylene acceptor compound prepared by first reacting one or more phenolic compounds represented by the following formula:

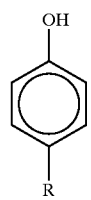

where R is selected from the group consisting of H, an alkyl group chain of 1–16 carbon atoms and an aralkyl group of 8–12 carbon atoms with an aldehyde in the presence of an ortho directing catalyst to obtain a phenolic novolak resin and then combining a resorcinol-formaldehyde novolak resin to obtain a phenolic and resorcinolic novolak resin blend, wherein the phenolic resin of formula (1) comprises methylene linkages characterized by at least 40 percent ortho-ortho bonding.

23. The vulcanizable rubber composition of claim 22, wherein the phenolic and resorcinolic novolak resin blend has a weight ratio of phenolic resin to resorcinolic resin between about 95:5 to 5:95.

24. The vulcanizable rubber composition of claim 22, wherein the phenolic novolak resin comprise methylene linkages characterized by at least 50 percent ortho-ortho bonding.

25. The vulcanizable rubber composition of claim 22, wherein the methylene acceptor is prepared by reacting (A) phenol and/or an alkyl phenol with (B) an aldehyde in the presence of (C) an ortho directing divalent metal salt catalyst to produce a high ortho phenolic novolak products containing at least 40% ortho-ortho phenolic methylene bridges and then (D) adding resorcinol or resorcinolic derivative or a meta-substituted phenol and then (E) reacting with an additional amount of an aldehyde.

26. The vulcanizable rubber composition of claim 25, wherein the resin blend comprises the following structures:

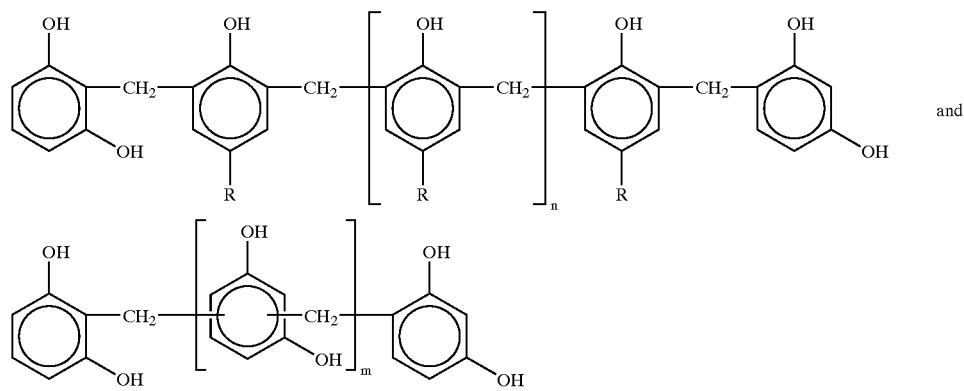

where n is equal to or greater than 1, and m is equal to or greater than 1.

27. The vulcanizable rubber composition of claim 25, wherein the molar ratio of phenol and/or alkylphenol to formaldehyde is about 1/0.4 to 1/0.86.

28. The vulcanizable rubber composition of claim 25, wherein the molar ratio of resorcinol or resorcinol derivative or m-substituted phenol to formaldehyde is about 1/0.4 to 1/0.7.

29. The vulcanizable rubber composition of claim 25, wherein the alkyl phenol is used to prepare the phenolic novolak resin, and the resin comprises o–o' methylene linkage in the range of about 40 to 70%.

30. The vulcanizable rubber composition of claim 25, wherein the alkyl phenol used to prepare the phenolic novolak is selected from para substituted alkyl chain containing 1 to 16 carbon atoms or aralkyl substituted phenols selected from the group consisting of p-cresol, p-tert-butylphenol, p-tert-octyl phenol, p-tert-butyl-phenol, p-tert-octyl phenol, p-tert-nonylphenol, p-nonylphenol, p-styrylphenol, p-ethylphenol, and a mixture thereof.

31. The vulcanizable rubber composition of claim 25, wherein the molar ratio of phenol and/or alkylphenol to aldehyde is between about 0.1:0.9 and about 0.9:0.1.

32. The vulcanizable rubber composition of claim 25, wherein the aldehyde is formaldehyde, acetaldehyde, propionaldehyde, butyraldehyde, isobutyraldehyde, valeraldehyde, crotonoaldehyde, benzaldehyde, furfural, or a mixture thereof.

33. The vulcanizable rubber composition of claim 25, wherein the resorcinolic derivative or meta-substituted phenol is selected from the group consisting of 2,4-dihydroxy benzophenone, 2,4-dihydroxy acetophenone, 4-styryl resorcinol, m-cresol, cashew nut shell liquid, phloroglucinol, 3-methyl-5-ethyl phenol, meta-isopropyl phenol, m-isoctyl phenol, 3,5-dimethyl phenol, and a mixture thereof.

34. The vulcanizable rubber composition of claim 22, wherein the methylene acceptor is prepared by reacting (A) one or more phenolic compounds represented by the following formula:

where R is selected from the group consisting of H an alkyl chain of $C_1$–$C_{16}$ carbon atoms and an aralkyl group of $C_8$–$C_{12}$ carbon atoms with (B) an aldehyde in the presence of (C) an azeotroping solvent and (D) an ortho directing catalyst comprising a divalent electropositive metal compound selected from the group consisting of oxides, hydroxides, formates, lactates, acetates, benzoates, and a mixture of calcium, barium, strontium, magnesium, zinc, manganese, cobalt and lead; (E) then adding resorcinol or resorcinolic derivative or a preformed resorcinol-formaldehyde novolak resin.

35. The vulcanizable rubber composition of claim 22, wherein the methylene linkages are characterized by at least 60 percent ortho-ortho bonding.

36. The vulcanizable rubber composition of claim 22, wherein the methylene acceptor comprises about 90 to about 98% o–o' methylene bridges.

37. The vulcanizable rubber composition of claim 22, wherein the methylene linkages are characterized by at least 85 percent ortho-ortho bonding.

38. The vulcanizable rubber composition of claim 22, wherein the methylene linkages are characterized by at least 95 percent ortho-ortho bonding.

39. The vulcanizable rubber composition of claim 34, wherein the azeotrope solvent is selected from the group consisting of toluene and xylene.

40. The vulcanizable rubber composition of claim 22, further comprising a reinforcing material selected from the group consisting of nylon, rayon, polyester, polyamide, fiberglass, and steel.

41. The vulcanizable rubber composition of claim 22, wherein the rubber composition is used in preparation of composite products for the manufacture of tires, power belts, conveyor belts, printing rolls, automobile floor mats, mud flaps for trucks or ball mill liners.

* * * * *